US011115283B2

(12) United States Patent
Power et al.

(10) Patent No.: US 11,115,283 B2
(45) Date of Patent: Sep. 7, 2021

(54) GEOGRAPHIC SERVICE CLASSIFICATION AND ROUTING

(71) Applicant: Intel Corporation, Santa Clara, CA (US)

(72) Inventors: Damien Power, Clonlara (IE); Alan Carey, Mayo (IE); Chris MacNamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 16/328,140

(22) PCT Filed: Sep. 30, 2016

(86) PCT No.: PCT/US2016/054803
§ 371 (c)(1),
(2) Date: Feb. 25, 2019

(87) PCT Pub. No.: WO2018/063332
PCT Pub. Date: Apr. 5, 2018

(65) Prior Publication Data
US 2019/0190785 A1    Jun. 20, 2019

(51) Int. Cl.
*H04L 12/24* (2006.01)
*H04L 12/927* (2013.01)
(Continued)

(52) U.S. Cl.
CPC ...... *H04L 41/0893* (2013.01); *H04L 41/5009* (2013.01); *H04L 43/0882* (2013.01);
(Continued)

(58) Field of Classification Search
CPC ............ H04L 41/0893; H04L 43/0882; H04L 47/805; H04L 67/18; H04L 41/5009;
(Continued)

(56) References Cited

U.S. PATENT DOCUMENTS 9,141,947 B1 *  9/2015  Furr ....................... H04L 43/12
2002/0009992 A1 *  1/2002  Jensen ................. H04W 16/18
                                                                455/446
(Continued)

FOREIGN PATENT DOCUMENTS

JP    2015523746 A    8/2015
KR    20130064292 A    6/2013
(Continued)

OTHER PUBLICATIONS

"International Application Serial No. PCT/US2016/054803, International Search Report dated May 24, 2017", 3 pgs.
(Continued)

*Primary Examiner* — Gbemileke J Onamuti
(74) *Attorney, Agent, or Firm* — Schwegman Lundberg & Woessner, P.A.

(57) ABSTRACT

Methods, systems, and computer programs are presented for managing resources to deliver a network service in a distributed configuration. A method includes an operation for identifying resources for delivering a network service, the resources being classified by geographic area. Further, the method includes operations for selecting service agents to configure the identified resources, each service agent to
(Continued)

manage service pools for delivering the network service across at least one geographic area, the service agents being selected to provide configurability for the service pools. The method further includes operations for sending configuration rules, to the service agents, configured to establish service pools for delivering the network service across the geographic areas. Service traffic information is collected from the service agents, and the resources are adjusted based on the collected service traffic information. Updated respective configuration rules are sent to each determined service agent based on the adjusting.

25 Claims, 12 Drawing Sheets

(51) Int. Cl.
*H04L 12/923* (2013.01)
*H04L 29/08* (2006.01)
*H04L 12/26* (2006.01)
*H04W 28/02* (2009.01)
*H04W 40/20* (2009.01)
*H04L 12/911* (2013.01)

(52) U.S. Cl.
CPC .......... *H04L 47/762* (2013.01); *H04L 47/805* (2013.01); *H04L 47/822* (2013.01); *H04L 47/829* (2013.01); *H04L 67/1021* (2013.01); *H04L 67/16* (2013.01); *H04L 67/18* (2013.01); *H04L 67/322* (2013.01); *H04W 28/0226* (2013.01); *H04W 40/20* (2013.01)

(58) Field of Classification Search
CPC ... H04L 47/762; H04L 47/822; H04L 47/829; H04L 67/1021; H04L 67/16; H04L 67/322; H04W 28/0226; H04W 40/20
USPC .......................................................... 370/230
See application file for complete search history.

(56) References Cited

U.S. PATENT DOCUMENTS

| | | | |
|---|---|---|---|
| 2003/0093496 | A1 | 5/2003 | O'Connor et al. |
| 2011/0131338 | A1 | 6/2011 | Hu |
| 2012/0259970 | A1 | 10/2012 | Hu et al. |
| 2016/0094480 | A1* | 3/2016 | Kulkarni ............. H04L 47/2441 370/230 |

FOREIGN PATENT DOCUMENTS

| | | |
|---|---|---|
| WO | WO-2012120289 A1 | 9/2012 |
| WO | WO-2018063332 A1 | 4/2018 |

OTHER PUBLICATIONS

"International Application Serial No. PCT/US2016/054803, Written Opinion dated May 24, 2017", 5 pgs.
"European Application Serial No. 16918025.4, Extended European Search Report dated Apr. 28, 2020", 8 pgs.
"International Application Serial No. PCT/US2016/054803, International Preliminary Report on Patentability dated Apr. 11, 2019", 7 pgs.
"European Application Serial No. 16918025.4, Communication Pursuant to Article 94(3) EPC dated Mar. 29, 2021", 5 pgs.

* cited by examiner

502 — SERVICE TABLE

| SERVICE | SERVICE PRIORITY | MAX LATENCY | COST MODEL | REVENUE MODEL | LIST OF GSRAS | SERVICE POOL TABLE ID |
|---|---|---|---|---|---|---|
| S1 | 5 | 900 | C1 | R1 | {G7, G15} | SP1 |
| S2 | 9 | 100 | C2 | R2 | {G1, G2, G3, G5} | SP2 |
| S3 | 2 | 3000 | C3 | R3 | {G6, G2, G8} | SP3 |
| ... | | | | | | |

FIG. 5A

504 — GSRA TABLE

| GSRA ID | NETWORK ADDRESS | LOCATIONS MANAGED | SERVICES MANAGED | POOLS MANAGED |
|---|---|---|---|---|
| G1 | {IP1, PT1} | A, B | S1, S3 | P1-P7 |
| G2 | {IP2, PT1} | C | S2 | - |
| G3 | {IP3, PT3} | D | S17 | P8 |
| G4 | {IP4, PT4} | E, F, G | S1, S2, S3 | P15 |
| ... | | | | |

FIG. 5B

602 — SERVICE POOL TABLE (SERVICE S1)

| LOCATION | GSRAS | CURRENT NUMBER HANDLERS | MAX NUMBER HANDLERS | PLANNED CAPACITY | CURRENT STREAMS | ... |
|---|---|---|---|---|---|---|
| A | 7 | 17 | 100 | 15000 | 11000 | |
| B | 15, 18, 19 | 25 | 50 | 25000 | 26000 | |
| ... | | | | | | |

FIG. 6A

604 — SERVICE CAPACITY (PER LOCATION)

| SERVICE | POOL CAPACITY | PLANNED STREAMS SUPPORTED | CURRENT STREAMS | CURRENT LATENCY | ... |
|---|---|---|---|---|---|
| S1 | 20 | 20000 | 5000 | 100 | |
| S5 | 20 | 18000 | 19000 | 250 | |
| S9 | 20 | 50000 | 80000 | 400 | |
| ... | | | | | |

FIG. 6B

GEOGRAPHIC SERVICE CLASSIFICATION AND ROUTING

CLAIM OF PRIORITY

This patent application is a U.S. National Stage Application under 35 U.S.C. 371 from International Application No. PCT/US2016/054803, filed Sep. 30, 2016, published as WO2018/063332 on Apr. 5, 2018, the entirety of which is hereby incorporated by reference herein.

TECHNICAL FIELD

The subject matter disclosed herein generally relates to methods, systems, and programs for network management, and more particularly, to methods, systems, and computer programs for managing resources to deliver a network service in a distributed configuration.

BACKGROUND

The proliferation of wireless-enabled devices has enabled an always-connected paradigm. For example, users are now commonly equipped with at least one mobile communication device (e.g., a smart phone, a table computer, etc.) capable of providing wireless data access in virtually any location. Mobile communications support a variety of data-driven applications, such as messaging, financial accounts access, online shopping, navigation, gaming and entertainment, encyclopedic services, news services, rating services, etc.

In addition, another class of wireless devices is emerging to couple systems that may not have traditionally comprised communication features to a network for purposes of monitoring, reporting, alarming, controlling, etc. For example, heating/ventilating/air conditioning (HVAC) systems, security systems, appliances, utility meters, parking meters, automobiles, etc., may be coupled to the Internet to provide access to users, operators, service organizations, etc. These "Internet-of-Things" (IoT) devices will provide unprecedented access and control to users.

Supporting the resulting increased wireless traffic may be problematic for the underlying network, such as by having to support increased signaling. Data-signaling traffic storms are currently happening, and it is expected to become worse as 5G and IoT data on the network grow exponentially. This data storm is triggering stresses and service outages on core elements such as policy servers, gateway servers, charging and revenue generating services, and subscriber databases. Network core nodes are struggling to maintain service levels and response times during these signaling storms.

BRIEF DESCRIPTION OF THE DRAWINGS

Various ones of the appended drawings merely illustrate example embodiments of the present disclosure and cannot be considered as limiting its scope.

FIG. 5A is a table for storing service data, according to some example embodiments.

FIG. 5B is a table for storing geographic service routing agent (GSRA) data, according to some example embodiments.

FIG. 6A is a table for storing service pool data for a service, according to some example embodiments.

FIG. 6B is a table for storing service capacity data per location, according to some example embodiments.

DETAILED DESCRIPTION

Figure 1:
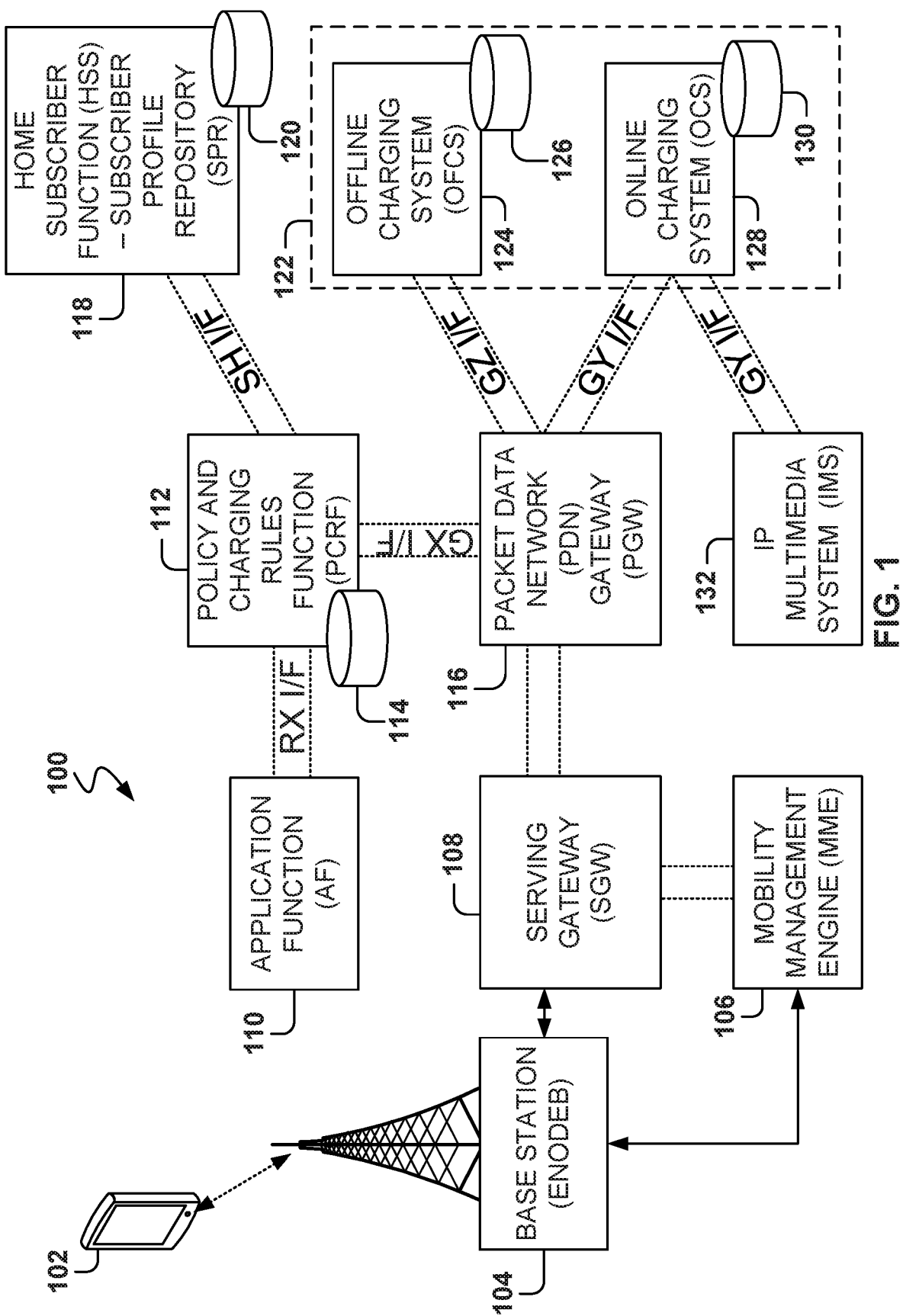
FIG. 1 illustrates an example embodiment of a system to monitor and control data flow in a network.

Example methods, systems, and computer programs are directed to managing resources to deliver a network service in a distributed configuration. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments provide ways to manage service traffic better by allocating resources closer to the edge of the network, where client devices are sending service requests. Geographic service routing agents (GSRA) are distributed throughout the network to configure service handler pools at specific locations, based on captured service traffic information data. The GSRA cooperate with an orchestrator to understand service traffic levels and determine how to improve service delivery. The service traffic is measured by analyzing service traffic at the higher levels of the ISO stack (levels 4-7), as well as understanding traffic at the lower levels (levels 1-3).

In some example embodiments, the traffic is routed to particular geographic service handlers, based on the originating location of the traffic, in order to lower the load on the network and the response times to clients. For example, in a big city, it is possible to dimension traffic to handlers in different parts of the city based on the geographic location of the originating traffic.

In another example, services are classified and the resources assigned to each service according to the service classification. For example, some IoT services may be classified as low priority and given less resources than other services, and the lower-priority services may be assigned service resources if other higher-priority services (e.g., for-pay services) do not consume all available resources. This way, if there is a surge in traffic, the network is able to manage the traffic according to service priority and desired quality-of-service (QOS) goals.

Legacy core nodes implement service handling in a generic model, where all traffic gets routed to one location with an independent monolithic service handling node. In some example embodiments presented below, service handling is broken down based on geographic location and service, and service traffic is routed as needed to the desired locations. The geographic location can be based on cell site, geographic coordinates, state, nation, etc. Further, the geographic location may be based on LTE's tracking area (for a group of cells) or the cell identifier for a specific cell, or in GSM's tracking area, or in a similar concept applied to 5G.

In an example embodiment, a tracking area is defined for identifying, at a macro level, a location in the network. For example, the tracking area may be defined as a 2 km² region in a city, which typically may cover an area comprised of several cells. In addition, the geographic location may be based on the "cell id" representing the area of coverage for the network or for a single cell. Some of the example services may include Internet traffic, Internet voice calls, email, Facebook™, weather, video, etc., and the services requests are detected and routed based on geographic location to location-specific service handling functions to guarantee service handling and latency response times This avoids traffic interfering with other traffic from other geographic areas. New services may be added dynamically without interruption, and the service pools and locations can be adjusted dynamically without service interruption.

In an embodiment, a method is provided. The method includes an operation for identifying resources for delivering a network service, the resources being classified by geographic area from a plurality of geographic areas. Further, the method includes operations for selecting service agents required to configure the identified resources, each service agent to manage service pools for delivering the network service across at least one geographic area, the service agents being selected to provide configurability for the service pools to deliver the network service for the identified resources. The method further includes an operation for sending respective configuration rules to each selected service agent. The configuration rules are configured to establish service pools for delivering the network service across the plurality of geographic areas. Further, the method includes operations for collecting service traffic information from the service agents, adjusting the resources for delivering the network service based on the collected service traffic information, and for sending updated respective configuration rules to the service agents based on the adjustment.

FIG. 1 illustrates an example embodiment of a system 100 to monitor and control data flow in a network. The present disclosure may reference components, systems, methodologies, etc., associated with certain technologies such as, for example, the 3GPP Long Term Evolution (LTE) or LTE-Advanced (LTE-A)-based wireless network standards, such as LTE Advanced Pro (LTE-A Pro), and related specifications that may be associated with the Diameter Protocol. These specifications may include, for example, 3GPP TS 36.300, V11.2.0, "Evolved Universal Terrestrial Radio Access (E-UTRA) and Evolved Universal Terrestrial Radio Access Network (E-UTRAN); Overall description; Stage 2 (Release 11)". Specific technologies are referenced to provide a readily comprehensible perspective from which to understand the embodiments disclosed herein, but are not intended to limit possible implementations to employing only these technologies.

In general, the system 100 may be network-configured to support a wireless front end of a cellular network as well as other wired or wireless front ends for accessing the network. In an embodiment, the core network may be an LTE evolved packet core (EPC) network. While an EPC network implementation is utilized in this disclosure to describe the various embodiments, other types of networks may be employed. For example, in addition to existing fourth generation (4G) wireless networks such as LTE networks, the systems, methodologies, etc. disclosed herein may likewise be implemented in a system including entities performing a wireless core network function role in emerging fifth generation (5G) networks. The system 100 may comprise, for example, a network of devices that may be configured to perform different functions such as those shown in FIG. 1. For example, computing devices such as servers (e.g., in a blade or rack configuration) may be coupled by a wired network (e.g., Ethernet) to work individually or collaboratively to perform the disclosed functionality. It is possible for one server to perform more than one function, for multiple servers to work together to perform a single function, etc. Moreover, interfaces may include hardware and/or software to allow one function to provide data to another. Consistent with the present disclosure, the Rx, Sh, Gx, Gy and Gz interfaces may be based on the Diameter protocol. Diameter may provide interfaces for authentication, authorization, traffic monitoring, device configuration, and accounting in system 100.

Base station (BS) 104 corresponds to a "cell" in a wireless cellular communication system (e.g., LTE). Wireless cellular systems may typically comprise a plurality of cells arranged in close proximity that cover large geographic areas to provide uninterrupted wireless service to service subscribers. However, one user equipment (UE) 102 and one BS 104 are illustrated in FIG. 1 for the sake of clarity. In an example of operation, the UE 102 may communicate wirelessly with the BS 104 when operating within the cell (e.g., when within the transmission range of BS 104). The UE 102 may comprise, for example, at least one wireless-enabled apparatus such as a mobile communication device, which could be a cellular handset or some other type of smartphone, a netbook, a notebook, a laptop, a palmtop, a wearable device such as a wristwatch, a head-mounted display, a device or system that does not operate primarily as a data processor but is equipped with at least basic data processing and communication resources such as an Internet-of-Things (IoT) device, a typically stationary computing device such as a desktop computer, server, a smart television or other "smart" device, a set-top box, etc.

The BS 104 interacts with a mobility management engine (MME) 106 or a serving gateway (SGW) 108 to support the wireless activity of the UE 102. The MME 106 may generally control the BS 104, and in that capacity, may manage bearer establishment, idle mode and handover operations for the UE 102. This may include choosing at least one SGW 108 when the UE 102 initiates operation in the cell of BS 104. The SGW 108 may route data packets from the UE 102 to other locations and may store the context (e.g., parameters, device state, etc.) of the UE 102 during handover to another cell, or may replicate user traffic in instances of lawful interception. An application function (AF) 110 may offer or control applications executing within system 100 that may depend on policy and charging control. An example of such an application is the Proxy-Call Session Control Function (P-CSCF). The AF 110 may provide quality of service (QoS) control and charging functionality for these applications. The AF 110 may be coupled to Policy and Charging Rules Function (PCRF) 112 via the Rx interface (e.g., a Diameter QoS/Policy Interface such as defined in the ETSI TS 129 214 V7.4.0 specification). The PCRF 112 may comprise at least a database 114 including provisions for policy control decision and flow-based charging control functionalities in system 100. The PCRF 112 may control service data flow detection, gating, QoS, flow-based charging, etc.

As illustrated in the system 100, the PCRF 112 may be coupled to a Packet Data Network (PDN) Gateway (collectively, "PGW") 116 via the Gx Interface (e.g., a Diameter QoS/Policy Interface such as defined in the ETSI TS 129 212 V7.4.0 specification). The PGW 116 may provide a gateway allowing the UE 102 to access external packet data networks (e.g., Internet). The PCRF 112 may also be coupled to a Home Subscriber Function (HSS)-Subscriber Profile Repository (SPR) 118 via the Sh Interface (e.g., a Subscriber Profile interface such as defined in the 3GPP TS 29.329 V9.2.0 specification). The HSS-SPR 118 may include at least a database 120 to store user and subscription-related data. For example, the HSS may authenticate subscribers (e.g., utilizing an International Mobile Subscriber Identity (IMSI) alone or combined with other public or private user data as a key), while the SPR may maintain subscriber policies and profiles for the QoS management.

The charging system 122 in the system 100 may comprise an Offline Charging System (OFCS) 124 including at least the database 126 and an Online Charging System (OCS) 128 including the database 130. The PGW 116 may be coupled to the OFCS 124 via the Gz interface (e.g., an offline charging interface such as defined in the 3GPP TS 29.209 V680 specification) and to OCS 128 via the Gy interface (e.g., an online charging interface such as defined in the 3GPP TS 32.299 VD40 specification). The OFCS 124 may collect resource usage information in database 126 concurrently with the usage of a resource (e.g., streaming media to the UE 102), and may then generate files for billing the user for the access at a later time. The OFCS 124 may not affect real-time access to the resource. The OCS 128 may allow a service provider to charge the user in real time based on resource usage. The OCS 128 may, for example, provide credit management and grant credit based on time, traffic volume or chargeable events. In addition, an Internet Protocol (IP) Multimedia System (e.g., collectively, "IMS") 132 may also be coupled to the OCS 128 through the Gy interface. The IMS 132 may utilize an IP-protocol-based communication to send multimedia data (e.g., text, audio, video, etc.) to the UE 102.

When the UE 102 attempts to download data (e.g., in response to running an application, streaming media, etc.), the charging system 122 may receive a request to determine whether the user of the UE 102 is a subscriber, the limitations of the subscription, whether there is available credit or the user should be billed for the access, etc. Charging system 122 may be stressed when a large number of new access requests are generated due to, for example, many users attempting to download data to UEs 102 at the same time (e.g., during an emergency, a special event such as a holiday, election, sporting event, concert, etc.), poorly designed services, policy-triggered re-rating on all open sessions, etc. This may cause a "storm" of reconnection requests to charging system 122.

Consistent with the present disclosure, some or all of system 100 may be composed of a cloud computing architecture coupled to a fog mesh network. The cloud computing architecture may include at least one computing device (e.g., server) coupled to a network (e.g., the Internet). For example, the at least one cloud server may be capable of providing data processing and/or data storage services to a variety of remotely-situated data consumers. The cloud computing system may be in communication with a mesh network of devices (e.g., a "fog") operating at the edge of the cloud. In an embodiment, the fog devices may include at least IoT devices.

The fog may be considered to be a massively interconnected network wherein the devices are in communication with each other (e.g., via radio links). This interaction may be performed using, for example, the open interconnect consortium (OIC) standard specification 1.0 released by the Open Connectivity Foundation™ (OCF) on Dec. 23, 2015. The OIC standard may allow for device-to-device discovery and the establishment of communications for interconnects. Other interconnection protocols that may be usable include, for example, the optimized link state routing (OLSR) Protocol, the better approach to mobile ad-hoc networking (B.A.T.M.A.N.), etc.

Communications within the fog may be passed along the most convenient path between any device to reach gateways providing access to the cloud. In these networks, the number of interconnections provide substantial redundancy, allowing communications to be maintained, even with the loss some of devices. Further, the mesh network architecture may allow limited devices (e.g., very low power, located at a distance from infrastructure) to be used, as the range to connect to another device in the fog may be less than the range to connect to the gateways.

Figure 2:
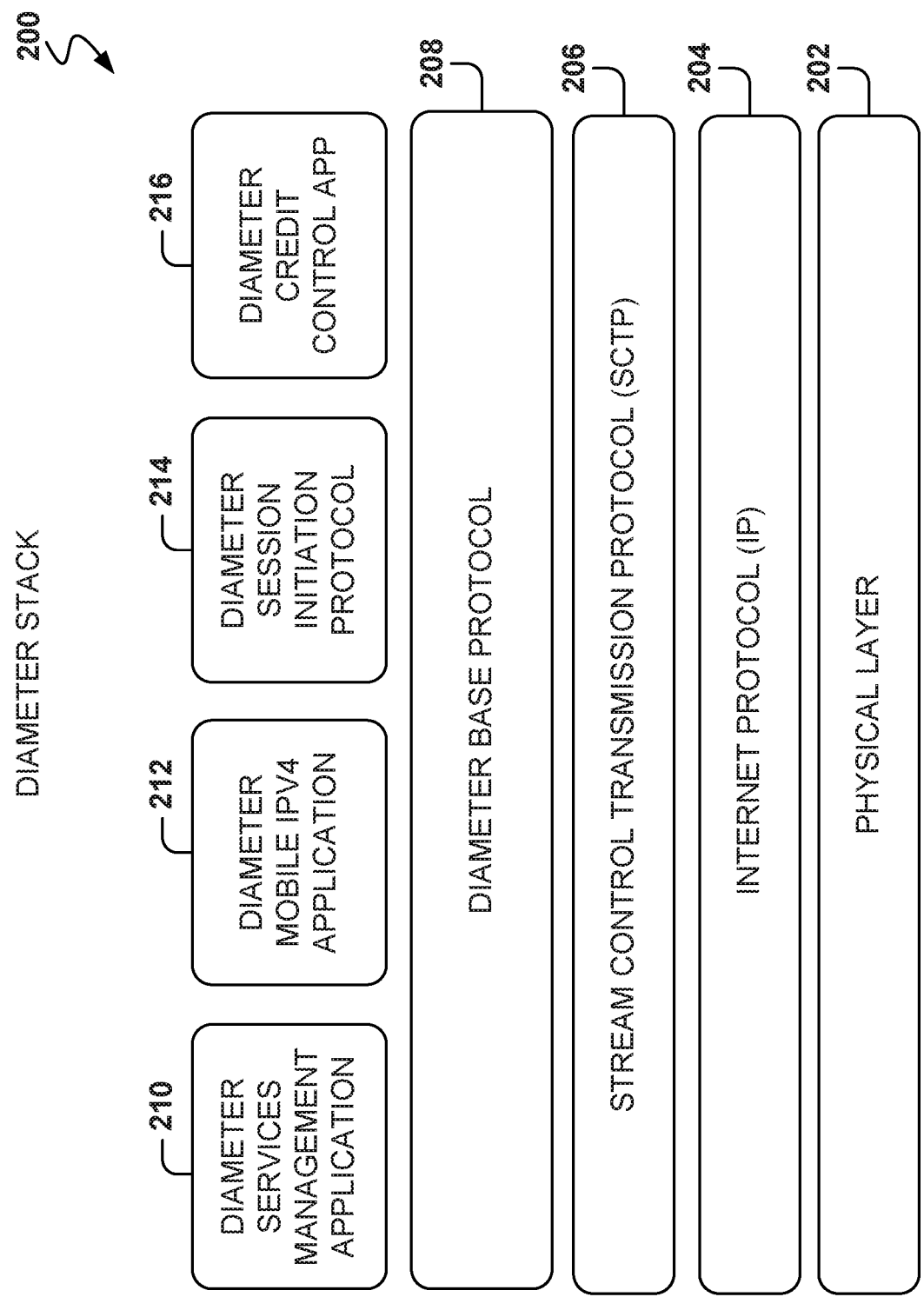
FIG. 2 illustrates an example configuration of a protocol stack usable in accordance with at least one embodiment of the present disclosure.

FIG. 2 illustrates an example configuration of a protocol stack usable in accordance with embodiments of the present disclosure. In some example embodiments, Diameter is a protocol used to exchange information in the Core resources in LTE/4G/5G—between gateways, policy servers, charging systems, databases and application servers—but any other protocol for exchanging network and service information may be utilized.

Diameter is an authentication, authorization, and accounting protocol that includes application programming interfaces (APIs) for access to information and configuration. Diameter manages the exchange of information, such as authentication, authorization, accounting, policy and charging control and mobility.

An example Diameter protocol stack 200 illustrates how the Diameter protocol may be utilized consistently with the present disclosure. Physical layer 202 may comprise the physical network (e.g., Ethernet) via which devices such as UE 102 may interact in system 100. IP protocol layer 204 may format the packets that will be transmitted via the physical layer 202 as IP packets. Stream control transmission protocol (SCTP) layer 206 is a transport-layer protocol that provides features such as connection-oriented data stream support, reliability, flow control and multiplexing. Diameter base protocol layer 208 provides, for example, capabilities-exchange-request/capabilities-exchange-answer (CER/CEA) message capabilities for use in supporting Diameter applications.

Example Diameter applications are illustrated in the top level of FIG. 2. In some example embodiments, a Diameter services management application 210, executing on a computing device, is used to implement real-time service-resource control for a variety of end user services such as network access, session initiation protocol (SIP) services, messaging services, video services, social media access, download services, etc. In an example embodiment, the GSRA is embodied as a new Diameter Agent or extension, but other embodiments may utilize other types of GSRA devices to manage services (e.g., to configure network devices and collect network and service information).

The Diameter mobile IPv4 application 212 may allow a Diameter server to authenticate, authorize, and collect accounting information for Mobile IPv4 services rendered to a mobile node. Diameter session initiation protocol (SIP) 214 is a service that allows a Diameter client to request the authentication of users and authorization of SIP resources usage from a Diameter server. Diameter credit control application 216 may provide a general solution to real-time cost and credit-control.

Diameter services may be utilized to obtain a wide variety of service-related information, such as geographic location of clients, traffic statistics for the service, traffic statistics by geographic location, statistics by service server or server pool, etc. This information is used, in some example embodiments, for allocation service resources by geography and by network location.

Figure 3:
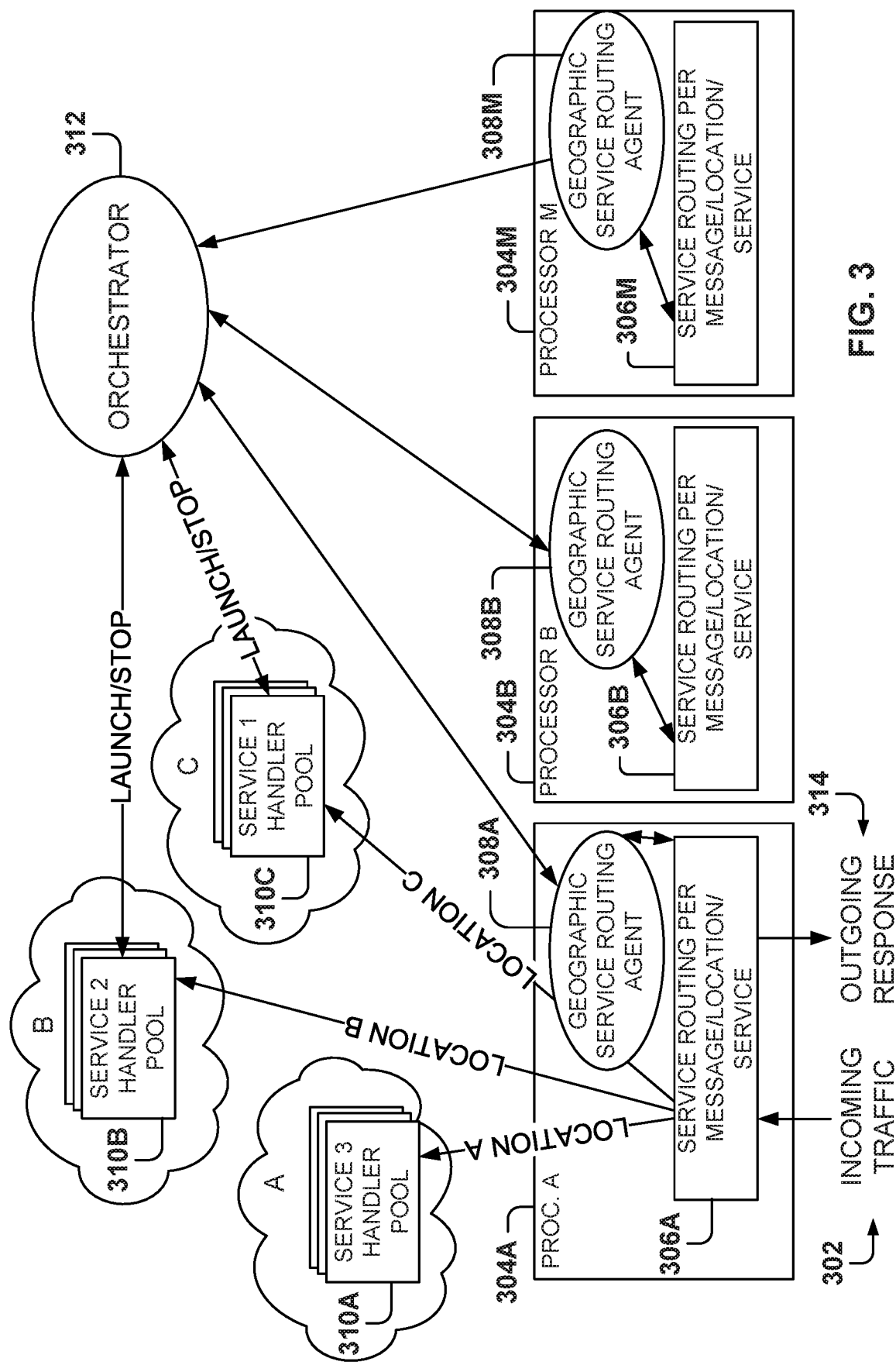
FIG. 3 is a block flow diagram illustrating an example embodiment of messaging pathways used to classify and route data service requests.

FIG. 3 is a block flow diagram illustrating an example embodiment of messaging pathways used to classify and route data service requests. Some current solutions for load balancing on the network are based on measuring traffic at level 2 or level 3, but this information is insufficient to identify in detail how clients are accessing the server or what the quality is of the service provided. The present embodiments look at traffic data at higher levels (4-7) to better distribute the allocation of service servers or handlers. For example, by looking at the location of the client instead of just looking at the IP address or VLAN address, it is possible to reduce the latency for accessing the service and to quickly adjust configuration during congestion.

The orchestrator 312 is the entity that manages the allocation of service resources throughout the network, or throughout a domain within the network. The domain may be defined by any of a plurality of criteria selected from a group consisting of geographic area, national borders, state borders, county borders, regional borders, continental borders, internet service provider (ISP) network, one or more services, or server provider. In other example embodiments different criteria for allocating the domain to the orchestrator 312 are also possible.

The GSRAs 308A, 308B, and 308M (collectively designated as 308) are computer-implemented agents for setting up service pools to implement the services and for collecting network traffic information. As used herein, network traffic information may include statistics related to traffic in the network, the statistics being obtained for any one of the seven layers of the ISO model. Therefore, the network traffic information may include IP traffic statistics or service-delivery statistics (e.g., number of active streams for a particular service). Further, service traffic information includes statistics regarding service delivery for a particular service.

The GSRAs 308 are distributed throughout the network to configure service handler pools at specific locations, based on captured service traffic information data. The GSRAs 308 are able to route traffic based on message type, geographic location, and the service type. The GSRAs 308 are also able to load balance the service traffic across multiple geographic service handlers. In some example embodiments, the GSRAs 308 are executed within a computer device, which is generally referred to as processor A 304A, processor B 304B, and processor M 304M (collectively, processor 304).

The GSRAs 308 and the orchestrator 312 cooperate to implement service-routing policies, and management operations may be performed by either the orchestrator 312, by the GSRAs 308, or both. Some example embodiments are presented regarding the division of responsibilities between the orchestrator 312 and the GSRAs 308, but other embodiments may perform different functions at different components. For example, in one implementation, the orchestrator 312 may be implemented within a GSRA 308. This allows addressing the needs of low-latency services where the scale up decisions can be made locally.

Service handler pools 310A, 310B, and 310C (collectively, service handler pools 310) include one or more servers configured to implement a network service, and perform service-related operations, such as responding to service requests. Each server in the pool may be implemented as one of several types of computer devices, such as a dedicated server, a shared server, a virtual server, a virtual machine, a process within a server, etc.

In some embodiments, GSRAs 308 are configured by orchestrator 312 to identify activated service handler pools 310 and their associated applications. In some embodiments, orchestrator 312 also provides GSRAs 308 with instructions on how to communicate with the activated service handler pools 310, for example by providing an Internet Protocol (IP) address of the service handler circuit. In an example embodiment, GSRA 308A configures processor A 304A to listen for data service requests received for a particular application, and also programs processor A 304A with the appropriate service handler pool 310A, 310B, or 310C for routing the requests.

In some embodiments, processor 304 is implemented as a hardware circuit. In some example embodiments, processor 304 is implemented in hardware within an intelligent network interface card (NIC) programmed with routing rules. In other embodiments, the processor 304 is implemented as a software routine, consisting of machine-executable instructions to be executed on a processor. In some embodiments, the processor 304 is implemented as a virtual machine.

Incoming traffic 302 is received by the processors 304, such as processor A 304A. In particular, incoming traffic 302 is received by the service routing (SR) per message/location/service 306A, which provides routing on a per message, per location, and per service basis. As illustrated, SR 306A, having been programmed for selecting a service handler pool 310 to route requests, forwards the received data service requests to one of the service handler pools 310. In some embodiments, after processing the data service request, the service handler circuit that received the request provides a response to the data service request to processor A 304A.

As illustrated, the service handler pools 310 include a set of multiple processing servers or handlers that provide service functionality for one or more network services. In some embodiments, at least one of the processing pools 310 is stateless, meaning that routing can be done at a message level and data service requests can go to any one of the processing pools in the available pool of processing pools. In other embodiments, one or more of the processing pools of service handler pools 310 is stateful, meaning that when a session starts, all subsequent requests have to go to the same service handler instance.

In an example embodiment, the orchestrator 312 configures GSRA 308A according to a default configuration. The GSRA 308A in turn programs processor A 304A to listen for data service requests associated with an application, and to identify which service handler pool 310 is to be used for routing incoming data service requests.

Processor A 304A classifies incoming data service requests according to their associated application or service. Having been programmed to identify which service handler pool 310 is associated with each service application, processor A 304A routes a data service request to the appropriate service handler pool 310 (e.g., service 1 handler pool 310C). After processing the data service request, the service handler pool 310C provides a response to processor A 304A. In some embodiments, the data service request does not warrant a response.

In some example embodiments, a copy of the incoming traffic 302 is routed to each processor 304. In alternate embodiments, incoming traffic 302 is routed to multiple separate network interfaces, one for each of processor A 304A, processor B 304B, and processor M 304M.

In an example embodiment, GSRA 308A programs processor A 304A to listen for Transmission Control Packets (TCP) and Stream Control Transmission Protocol (SCTP) packets arriving on port 3868, which has been defined in RFC 6733 as the port running the Diameter protocol for both TCP and SCTP. In some embodiments, the diameter protocol is defined by at least RFC 6733. Embodiments disclosed herein are not to be limited to any particular protocol. The GSRA 308A may program processor A 304A to listen for packets defined by additional protocols, such as transport protocols defined with respect to 5G networks.

In some embodiments, the GSRA 308A programs processor A 304A to listen for UDP packets arriving on port 1813, which is dedicated to Radius protocol-based traffic, which is defined by at least RFC 2866.

The GSRA 308 in some embodiments is implemented as a hardware circuit. In other embodiments, GSRA 308 is implemented as a software routine consisting of computer-executable instructions that, when executed by a processor or processor core, perform at least one embodiment disclosed herein. In alternate embodiments, the GSRA 308 is implemented as a virtual machine.

The service handler pools 310, in some embodiments, are comprised of hardware circuits. In other embodiments, service handler pools 310 are implemented as software routines consisting of computer-executable instructions that, when executed, perform at least one embodiment disclosed herein. In alternate embodiments, the service handler pools 310 are virtual machines.

The orchestrator 312, in some example embodiments, is implemented as a hardware circuit. In other embodiments, the orchestrator 312 is implemented as a software routine consisting of computer-executable instructions that, when executed by a processor or processor core, perform at least one embodiment disclosed herein. In alternate embodiments, the orchestrator 312 is implemented as a virtual machine.

In some example embodiments, the GSRAs 308 are configured to identify traffic above level 4 into the Diameter protocol messages. This allows the identification of Diameter traffic, specific message types, geographic location information, and the type of service (e.g., rating group parameter). The rating group and the location group parameters identify the service and location in the diameter message. The configuration of these routing flow rules on a NIC, or at the virtual-switch level, distributes the service-specific traffic to geographic-specific service handlers.

In some example embodiments, the orchestrator 312 identifies the resources for delivering a network service based on the current service traffic, where the resources are classified by geographic area (e.g., locations A, B, and C) from a plurality of geographic areas. The orchestrator 312 then determines which service pools 310 are to be configured to assign the identified resources for delivering the service based on the geographic areas. For example, some areas may have a large amount of service traffic, so service handler pools 310 may be added, while other areas having low service traffic may require a decrease in the current number of service handlers or leave the current configuration unchanged.

The orchestrator 312 also checks the availability of resources in the different locations and identifies the resources based on the traffic and availability. In some cases, the orchestrator may request a migration of resources from a geographic location to another, such as by moving virtual machines two different servers in different locations. The orchestrator 312 selects the GSRAs 308 that must be accessed to be able to configure any new changes to the resource pool. Therefore, the service agents are selected to provide configurability for the service pools to deliver the network service for the identified resources. The orchestrator then sends respective configuration rules to each selected service agent, the configuration rules being configured to establish the service pools for delivering the network service across the plurality of geographic areas.

Service traffic information is collected periodically by the GSRAs 308 and shared with orchestrator 312. The orchestrator 312, or the GSRAs 308, then adjust the resources for delivering the network service based on the collected service traffic information, and updated configuration rules are sent to the service agents based on the adjustment.

The orchestrator 312 sends, in some example embodiments, geographic service routing configuration to the GSRA 308. In an example embodiment, the geographic service routing configuration includes one or more of a message identifier used to discriminate between the start of a session and any other message in the session, a service classifier that includes the service request identifier (ID), a location classifier that identifies the location of the request, a traffic sliced in milliseconds that identifies the time period where service requests are counted and reported, and a service pool that includes the address of the pool of geographic service handlers to handle requests.

Figure 4:
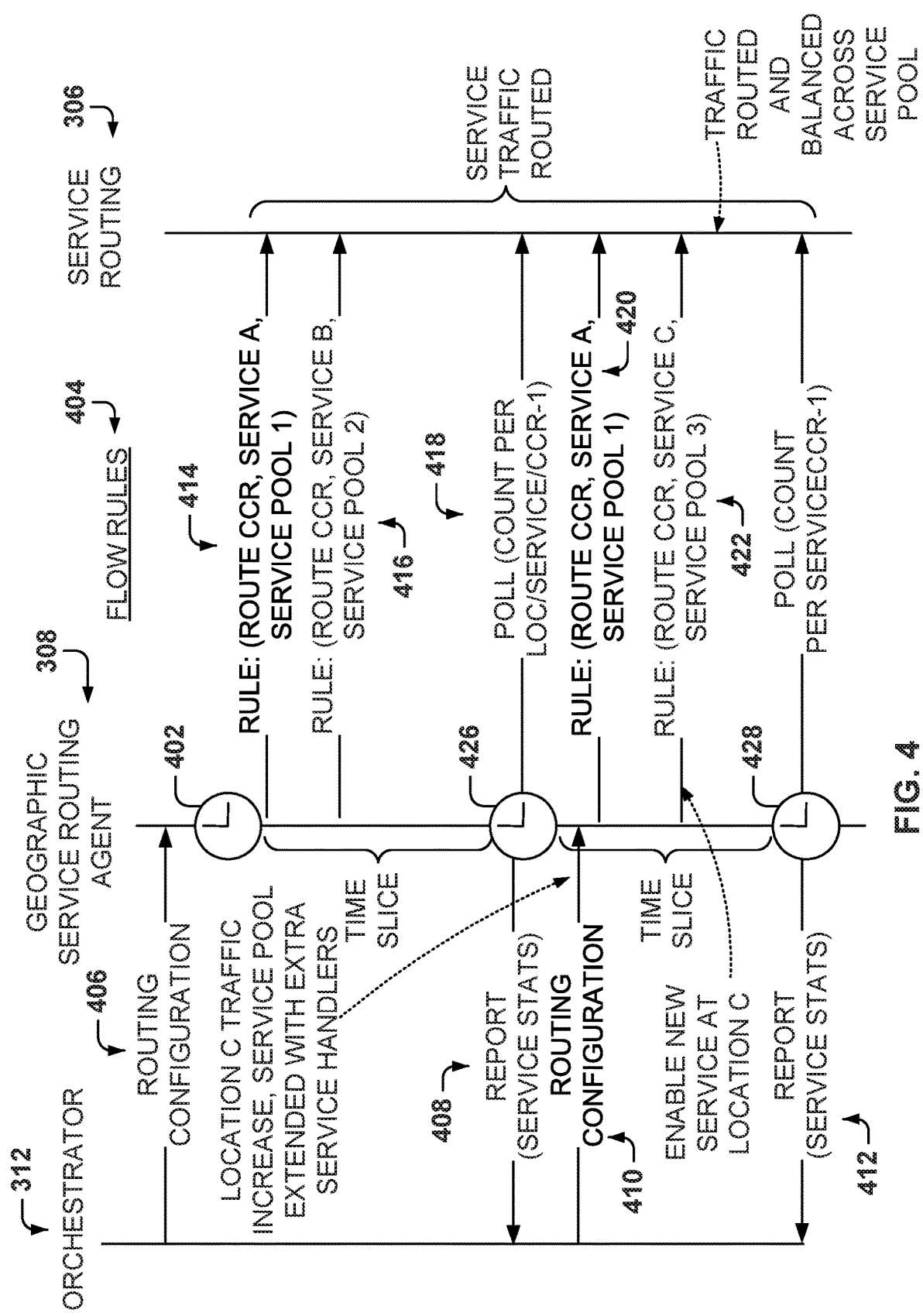
FIG. 4 is a timing diagram illustrating an embodiment of a process for scaling out a processing resource.

FIG. 4 is a timing diagram illustrating an embodiment of a process for scaling out a processing resource. The example embodiment illustrated in FIG. 4 shows the deployment and configuration of contracted services per location over diameter CCR messages. Location and services are identified, routed, and load balanced. In an example embodiment, the time slice for reporting statistics is 100 ms, but any other time slices are possible, such as in the range from 10 ms to 10 seconds or more.

The GSRA 308 polls the location service statistics counter. The flow identifies the case where the initial configuration is deployed for known location and services. The monitoring information is relayed back to the orchestrator 312, which identifies that requests for location C Service 1 has increased, so the orchestrator 312 scales the service handlers for service 1 at this location and reconfigures the service pool to include these new handlers to serve the increased traffic.

A timeline below GSRA 308 illustrates the activity of the GSRA 308, which generates flow rules 404 transmitted to service routing 306, which configures the service handler pools 310. The GSRA 308 also communicates with the orchestrator 312 to report service statistics (at operations 408 and 412) and to receive routing configuration (at operations 406 and 410).

In some embodiments, when maximum scaling has been reached (e.g. no more servers are available to deploy new service handlers), the policy configured in the service routing 306 will differentiate based on a set of criteria, such as determining which services are granted access to the service handlers. For example, services that generate revenue may be given higher priority than non-revenue-generating services. Also, services that require low latency may be given a high priority to avoid lengthy re-try mechanisms. In some embodiments, the services associated with each of the diameter request packets are discovered by reading the attribute-value pairs (AVPs) in the messages. Differentiating on a per-service basis allows per-service control and a way of implementing network slicing, for example in 5G networks.

The service routing policy may be configured to restrict non-critical, lower priority workloads such as M2M/IoT devices during periods of high load on the network, allowing the network to prioritize critical services. In some embodiments, the policy may be re-configured dynamically based on load. Allowing the policy to be configured on a per-load or per-service basis may also reduce priority for requests from rogue or misbehaving devices, thus reducing their chances of causing high loads on the network.

The GSRA 308 configures two rules after time 402: rule 414 to route to service A instructions for service pool 1, and rule 416 to route to service B instructions for service pool 2. At time 426, a report is sent to the orchestrator 312 showing that service A traffic has increased (operation 408), and the associated service pool is scaled out (operation 410) to include extra service handlers. In particular, the service stats reported by the GSRA 308 at operation 408 informed the orchestrator 312 that service pool A needed to be scaled out. Accordingly, after time 426, routing configuration arrives from the orchestrator to configure service pool 1 (operation 410), which provides service A, so the service is scaled out in operation 420. The routing configuration also shows that a new route to service pool 3, providing service C, is configured at operation 422. In some embodiments, by time 428, the traffic is routed and load balanced across service pools.

The GSRA 308 is able, in real time, to route and load balance service traffic to specific geographic service handlers. For example, during data storms, the transaction rates on geographic service-specific traffic are reported, and this information may be used to launch new geographic-specific service handlers to react to the data storm in that area, thus guaranteeing response times.

In some example embodiments, in a virtualized world, it is possible to move service handlers closer to the edge of the network in order to reduce latency for responding to client requests. If the client demand then moves to a different location (e.g., at different times of the day), then the service resources can be moved to a different location in order to follow the client demand Geographic location thus becomes a parameter for determining where the active handlers are situated.

FIG. 5A is a table for storing service data, according to some example embodiments. The service table 502 is for storing service-related data, and in an example embodiment, the service table 502 includes fields for a service identifier, a service priority, a maximum latency for the service, a cost model, a revenue model, a list of GSRAs 308, and a service pool table identifier.

The service identifier is a unique identifier assigned to each service, and it is used to link the information to other tables. The service priority identifies the service delivery priority for the different services, where services with higher priority will be allocated services with a higher priority than services with lower priority.

The maximum latency is the value of the desired maximum latency for responses submitted by clients to the service servers (e.g., 900 ms). The cost model and the revenue model identify a cost for delivering the service and a revenue for delivering the service. For example, a cost model may include that the service delivery provider has to pay fees or royalties to a third party, and the revenue model may identify if the service is delivered for free or if the user pays for accessing the service.

The list of GSRAs 308 identifies a set of GSRAs 308 configured for delivering the service (as illustrated in FIG. 3). For example, service S1 may utilize GSRAs G7 and G15, while service S2 may utilize GSRAs G1, G2, G3, and G5. The GSRA identifiers are linked to GSRA table 504 described below with reference to FIG. 5B. The service pool table identifier identifies the service pool table identifier that stores information for the corresponding service pool, as illustrated below with reference to FIG. 6A.

One example of how service resources are allocated under changing conditions is when allocating resources for a public event with a large attendance, such as a rock concert or a football match. If all the traffic from the rock concert is routed to the same place as the traffic from the rest of the city, there may be a reduction in service for both the people at the concert and the people in the city. In an example embodiment, the location of the concert is identified and then resources are scaled up to serve the temporary large number of people at this one location. This way, service quality is not impacted for the people in the city that are not attending the concert.

If the network has a large number of service servers, the embodiments presented herein allow the service provider to allocate servers based on geographic location and service demand. In some example embodiments, resources may be allocated based on their ability to generate revenue, where some revenue-generating services are given higher priority and more resources in order to improve the revenue stream, as compared to services that do not provide revenue.

FIG. 5B is a table for storing geographic service routing agent (GSRA 308) data, according to some example embodiments. The GSRA table 504 stores GSRA-related data, and in an example embodiment, the GSRA table 504 includes a GSRA identifier, a network address, a set of geographic locations managed by the GSRA, services managed by the GSRA, and service pools managed by the GSRA.

The GSRA identifier is a unique identifier for each GSRA 308, and is linked to a field in the service table 502. The network address includes information for accessing the GSRA, such as an IP address and a port number, but other types of identifier might be used to access the service. The "locations managed" field includes a set of the locations (which may be empty) managed by the corresponding GSRA 308, and the "pools managed" field includes a set (which may be empty) of the service handler pools configured by the GSRA 308.

In an example embodiment, the geographic service request classification is provided with routing and load-balancing for online charging systems. The online charging systems host revenue-generating services that actively monitor users' sessions in real time (e.g., granting quota with configurable times for use).

Instead of monolithic nodes that do not differentiate between location or different service-type requests, geographic service handlers are utilized. Instead of having all service requests served from the same location with traffic traversing the same path and all services having the same response time, the geographic specific service handlers have custom functionality, guaranteed response times, location isolation, and may be geographically orchestrated and scaled independently.

The GSRA 308 is configured by the orchestrator 312 at geographic and service levels in order to route and load-balance traffic to one or more geographic service handler pools, while providing feedback for monitoring and orchestration to allow for geographic service handling scaling. Further, launching of new geographic-specific charging services can be isolated and tested independently by the instantiation of the service handlers and the addition of new routing rules via the GSRA 308.

FIG. 6A is a table 602 for storing service pool data for a service, according to some example embodiments. FIG. 6A illustrates a service pool table 602 associated with a particular service (e.g., service S1 in service table 502) that identifies the resources in use for the service. The service pool table 602 includes entries for a location identifier (e.g., location A in FIG. 3), a set of GSRAs 308 allocated for managing this service, the current number of handlers (e.g., servers) allocated to this service and their respective location, a maximum number of handlers, a planned capacity, and the current number of streams.

The planned capacity identifies the estimated number of users accessing the service at the respective location, and the current number of streams identifies the current number of streams (e.g., users) accessing the service at the respective location.

For example, a pool of servers is configured to handle 1000 calls per second, and to report every second on the number of calls being handled. If the pool of servers (e.g., via the GSRA 308) reports that there 500 calls per second being handled, the orchestrator 312 may reduce the number of servers in that pool, as the pool is right now over-served. On the other hand, if a report is received with 1500 calls per second, the orchestrator 312 may increase the number of servers in that pool. This helps prevent service outages and an undesirable increase in response latency. Further, if the service provider is paid according to the number of servers in use, the service provider may optimize the number of servers in use to reduce expenses.

FIG. 6B is a table for storing service capacity data per location, according to some example embodiments. The service capacity table 604 includes fields for a service identifier, a pool capacity value, a number of planned streams supported, a current number of streams, and a current measured service latency.

The service identifier is linked to the service table 502. The pool capacity indicates the maximum number of handlers reserved for that service in that location. The planned number of streams supported identifies the maximum planned number of clients supported at a particular time. The current number of streams indicates how many streams are accessing the service at that location at the present time, and the current latency identifies an average latency response time for the handlers in the current allocation.

Multiple services may be supported at a given location, such as access to Facebook®, messaging applications, a computer on a car, a computer on a refrigerator, or some other IoT services, such as a computer on a vending machine. At a moment in time, the orchestrator 312 may decide to scale down some of the services in order to scale out some revenue-generating services. For example, services generated at mobile phones may produce higher revenues than services for communicating to a vending machine. This way, the network traffic is configured appropriately based on service priority.

Further, the service resources may be allocated based on the time of day. If, in a certain geography, a large number of calls are made between 8 AM and 9 AM, the services may be configured accordingly to compensate for the spike in demand at that time. Other services, like services related to vending machines, may be throttled to a later time when there is less traffic on the network.

Further, the service handlers may be configured in order to reduce the round-trip time from the client to the server, by allocating service handlers closer to the clients at the edge of the network. Thus, the services may be load balanced across services and across locations.

It is noted that the embodiments illustrated in FIGS. 5A-5B and 6A-6B are examples and do not describe every possible embodiment. Other embodiments may utilize different fields, or combine tables, or distribute the table content across a plurality of devices, or utilize fewer or additional tables, etc. The embodiments illustrated in FIGS. 5A-5B and 6A-6B should therefore not be interpreted to be exclusive or limiting, but rather illustrative.

Figure 7:
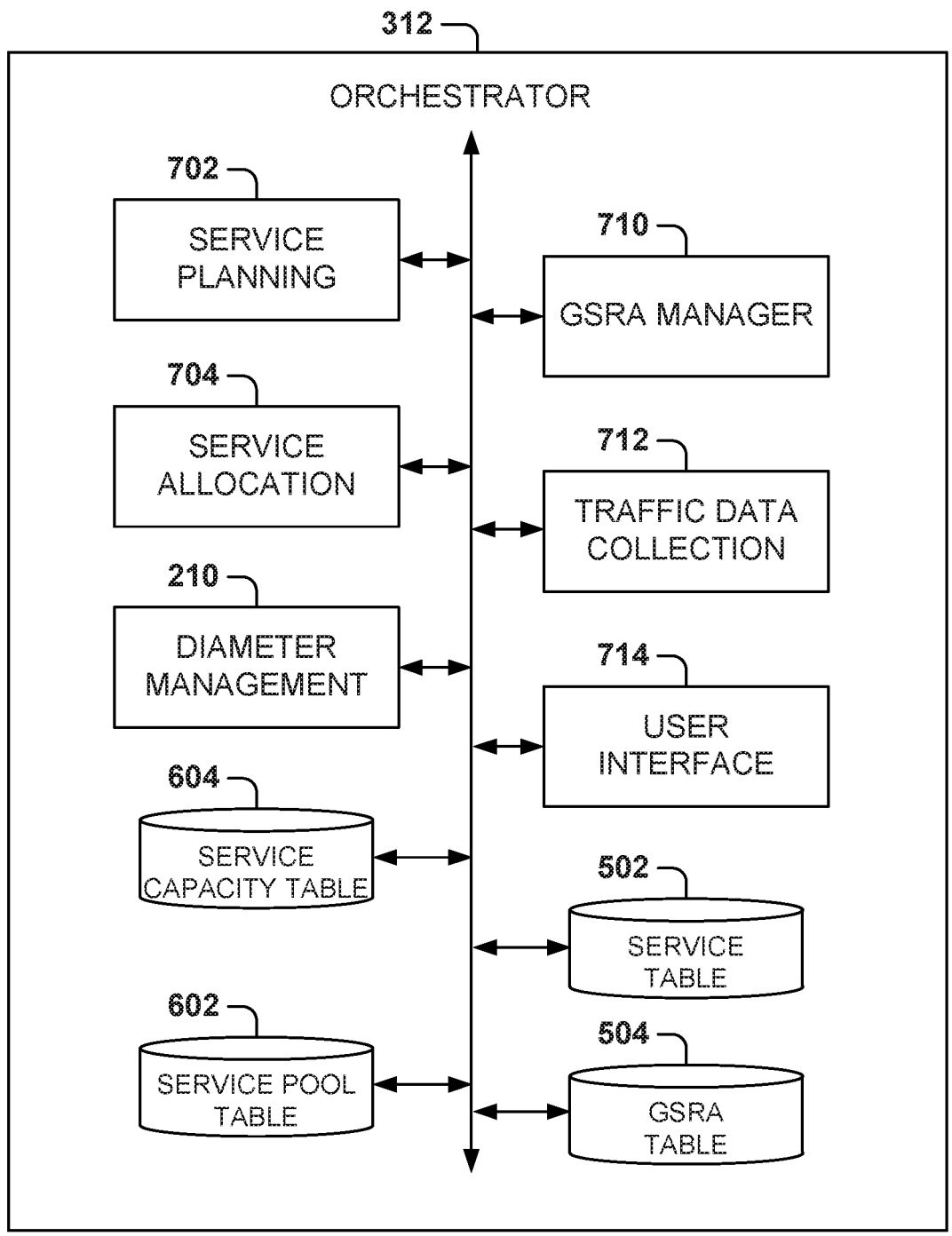
FIG. 7 is an architecture for an orchestrator, according to some example embodiments.

FIG. 7 is an architecture for an orchestrator 312, according to some example embodiments. In an example embodiment, the orchestrator 312 includes a service planning module 702, a GSRA manager 710, a service allocation module 704, a traffic data collection module 712, a diameter services management application 210, a user interface 714, and a plurality of databases, which include the service capacity table 604, the service table 502, the service pool table 602, and the GSRA table 504.

The service planning module 702 determines how the service resources are allocated, including determining which service handlers are allocated by geography. The GSRA manager 710 manages the allocation of GSRAs 308, which includes instantiating the GSRAs 308 in the respective processors and sending the configuration parameters to the GSRA 308.

The service allocation module 704 works with the service planning module 702 and the GSRA manager 710, at least, to determine how service resources are allocated dynamically. The traffic data collection module 712 collects traffic data from the network (e.g., the GSRAs 308), and this data is made available to the other modules in the orchestrator 312.

The diameter services management application 210 provides support for the diameter protocol and the respective APIs. The user interface 714 provides user-interface abilities for the system administrator to configure the orchestrator 312 and to obtain data, such as live traffic data or current allocation of resources.

The cooperation between the orchestrator 312 and the GSRAs 308 allows for geographic service and traffic isolation, improved performance, and better response times as traffic is segregated, per location and per service, and routed to specific service handlers, as well as the detection of geographic service hot spots (e.g., a sports event) to trigger deployment of more service handlers for this geographic area.

It is noted that the embodiments illustrated in FIG. 7 are examples and do not describe every possible embodiment.

Other embodiments may utilize different modules, fewer modules, or combine the functionality of several modules, etc. The embodiments illustrated in FIG. 7 should therefore not be interpreted to be exclusive or limiting, but rather illustrative.

Figure 8:
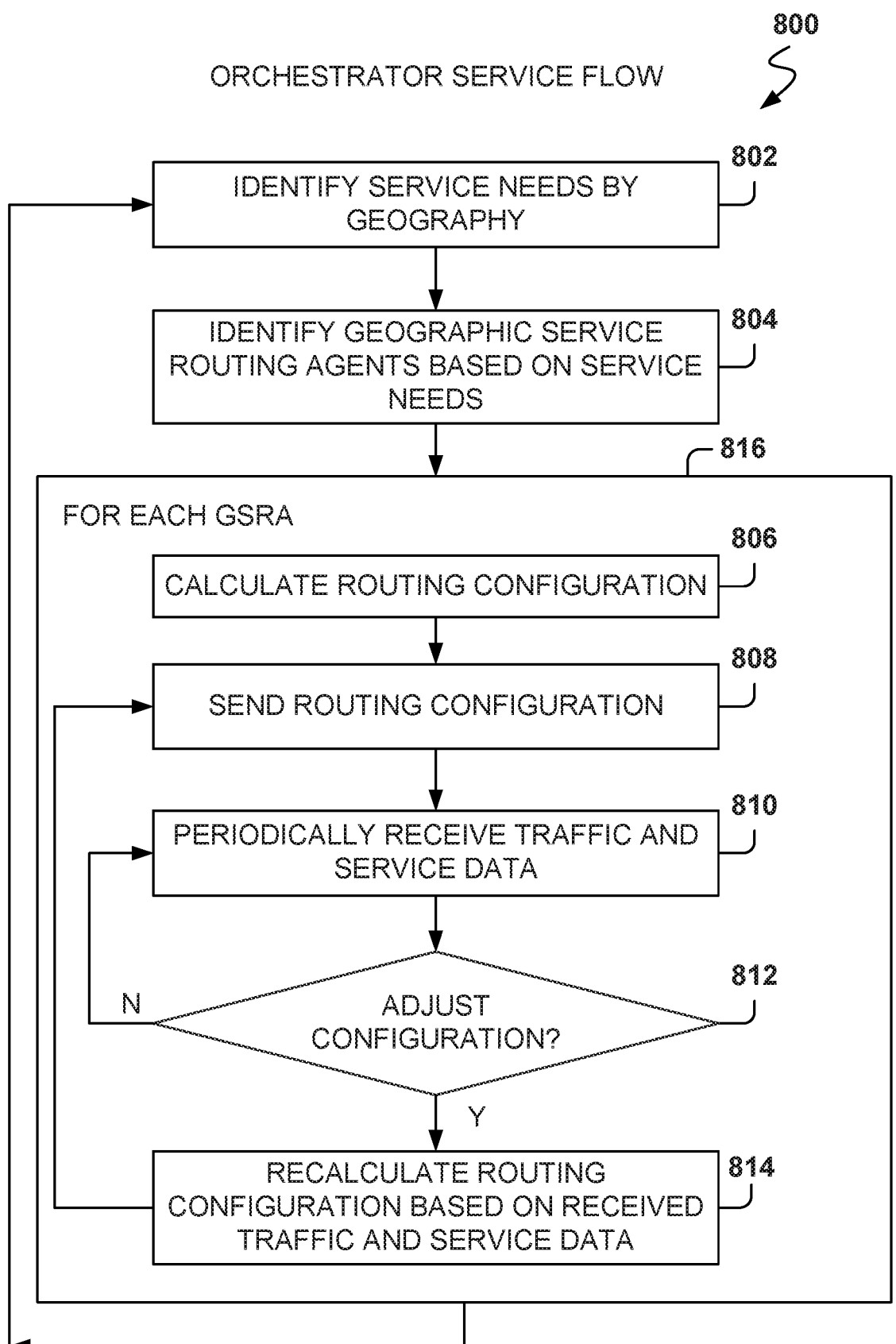
FIG. 8 is a flowchart of a method for managing service resources at an orchestrator, according to some example embodiments.

FIG. 8 is a flowchart of a method 800 for managing service resources at an orchestrator, according to some example embodiments. While the various operations in the flowcharts of FIGS. 8-11 are presented and described sequentially, one of ordinary skill will appreciate that some or all of the operations may be executed in a different order, be combined or omitted, or be executed in parallel.

At operation 802, the orchestrator 312 identifies the service needs by geography. The service needs may be identified by a system administrator, or by analyzing traffic patterns (current and historical), or a combination of both. The service needs include parameters related to the demand on the service, such as overall user demand, or demand by region, etc.

From operation 802, the method 800 flows to operation 804 for identifying the GSRA 308 based on the service needs. From operation 804, the method 800 flows to operation 816, which is performed for each GSRA 308.

At operation 806, the routing configuration is calculated. The routing configuration determines how service traffic is routed by geography, and by service pool. In operation 808, the routing configuration is sent to the appropriate GSRA or GSRAs 308.

At operation 810, the orchestrator 312 receives traffic and service data periodically from the set of GSRAs 308. From operation 810, the method 800 flows to operation 812, where a check is made to determine if the current configuration is to be adjusted based on the traffic and service data. If the configuration is to be adjusted, the method 800 flows to operation 814, and if the configuration data is not to be adjusted, the method 800 flows back to operation 810.

At operation 814, the routing configuration is recalculated based on the received service and the traffic data. From operation 814, the method 800 flows back to operation 802.

Figure 9:
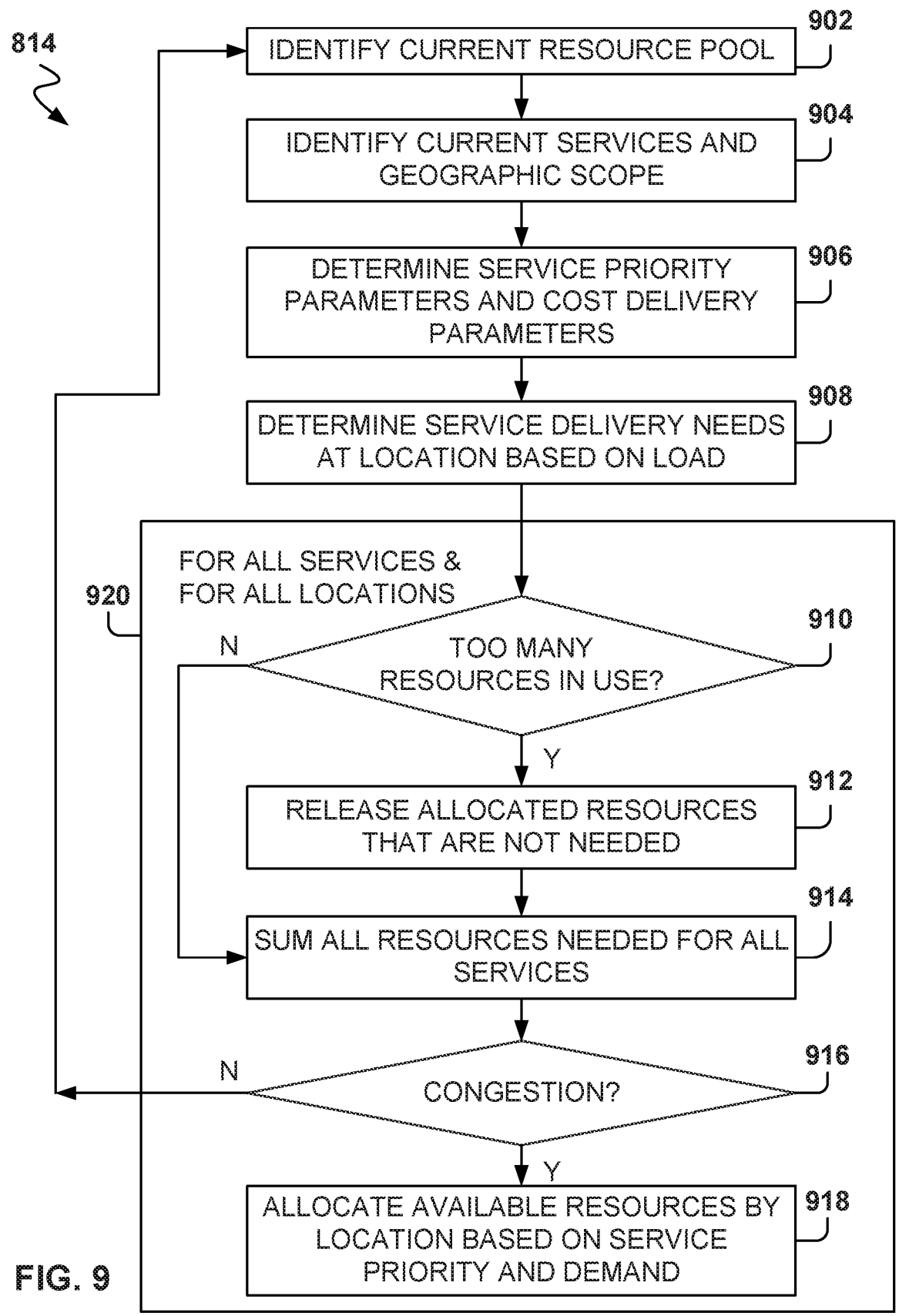
FIG. 9 is a flowchart of a method for managing resources to deliver network services, according to some example embodiments.

FIG. 9 is a flowchart of a method 814 for managing resources to deliver network services, according to some example embodiments. At operation 902, the current resource pool being utilized is identified, and at operation 904 the current services being delivered, as well as the geographic scope of the service handler pools, are identified.

From operation 904, the method 814 flows to operation 906 to determine service priority parameters and cost-of-delivery parameters. For example, the service priority parameters may include a desired server latency (or network latency) for responding to clients and the cost-of-delivery parameters may determine the cost per active service server. At operation 908, a determination is made on the service delivery needs at each location-based on the load (e.g., number of active streaming clients).

From operation 908, the method 814 flows to operation 920, which is performed for all services and all geographic locations. At operation 910, a check is made to determine if too many resources are in use. For example, this determination may be made when the number of clients per server goes below a predetermined threshold (e.g., 100 clients per server).

If there are too many resources in use, the method 814 flows to operation 912, and if there are not too many resources in use, the method 814 flows to operation 914. At operation 912, allocated resources that are not needed are released. At operation 914, a calculation is made to add up all the resources needed to support all services, and based on this calculation, a check is made at operation 916 to determine if there is service congestion (e.g., the number of clients per server is above a predetermined threshold at one or more geographic locations).

If there is congestion, the method 814 flows to operation 918, and if there is no congestion, the method 814 flows back to operation 902. At operation 918, the available resources are allocated by location based on the service priority and the current demand.

Figure 10:
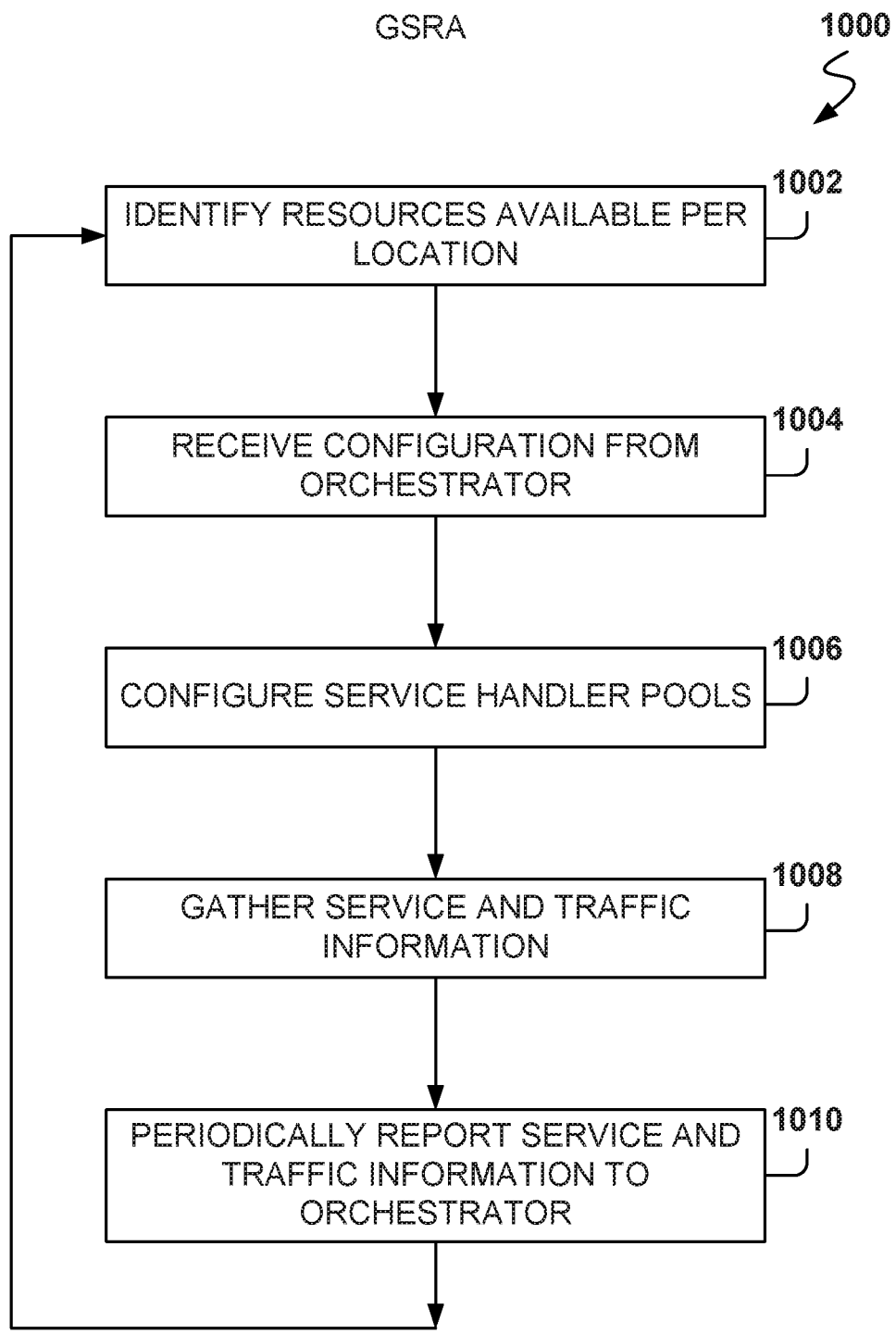
FIG. 10 is a flowchart of a method for operations executed by the Geographic service routing agents (GSRA), according to some example embodiments.

FIG. 10 is a flowchart of a method 1000 for operations executed by the GSRA 308, according to some example embodiments. At operation 1002, the GSRA 308 identifies the resources available for location. From operation 1002, the method 1000 flows to operation 1004 for receiving configuration data from the orchestrator 312.

From operation 1004, the method 1000 flows to operation 1006, where the service handler pools are configured based on the received configuration from the orchestrator 312. From operation 1006, the method 1000 flows to operation 1008, where service and traffic information is gathered by the GSRA 308. In an example embodiment, the Diameter protocol is utilized to gather the service and traffic information, but other example embodiments may utilize other protocols, such as the Radius protocol.

From operation 1008, the method 1000 flows to operation 1010 for periodically reporting service and traffic information to the orchestrator 312. From operation 1010, the method 1000 flows back to operation 1002.

Figure 11:
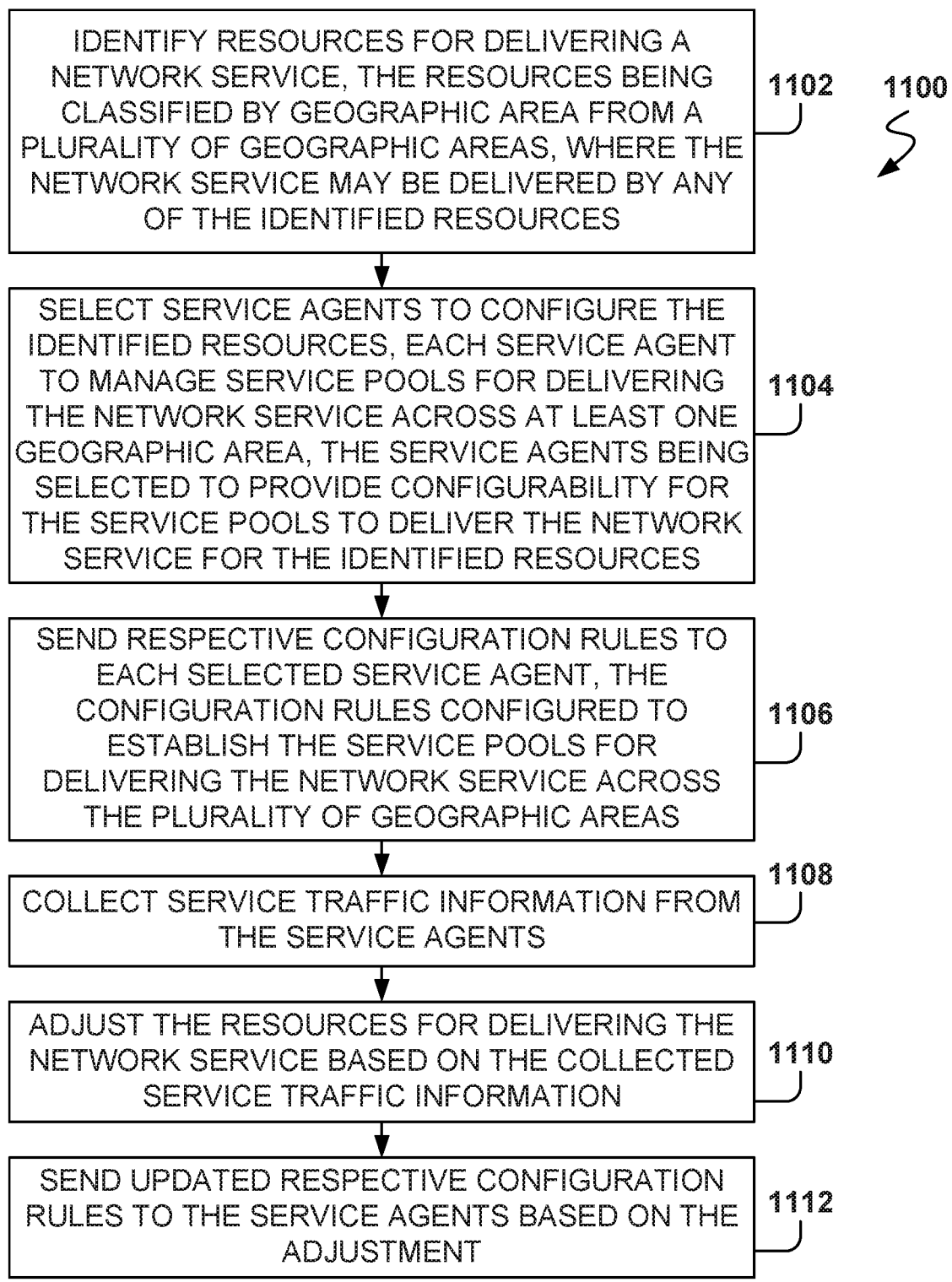
FIG. 11 is a flowchart of a method for managing resources to deliver a network service in a distributed configuration, according to some example embodiments.

FIG. 11 is a flowchart of a method 1100 for managing resources to deliver a network service in a distributed configuration, according to some example embodiments. At operation 1102, resources are identified for delivering a network service, the resources being classified by geographic area from a plurality of geographic areas.

From operation 1102, the method 1100 flows to operation 1104, where the service agents to configure the identified resources are determined. At operation 1106, the orchestrator 312 sends respective configuration rules to each determined service agent. The configuration rules are configured to establish service pools for delivering the network service across the plurality of geographic areas.

From operation 1106, the method 1100 flows to operation 1108 for collecting service traffic information from the service agents. At operation 1110, the resources for delivering the network service are adjusted based on the collected service traffic information, and at operation 1112, updated respective configuration rules are sent to each determined service agent based on the adjusting at operation 1110.

Figure 12:
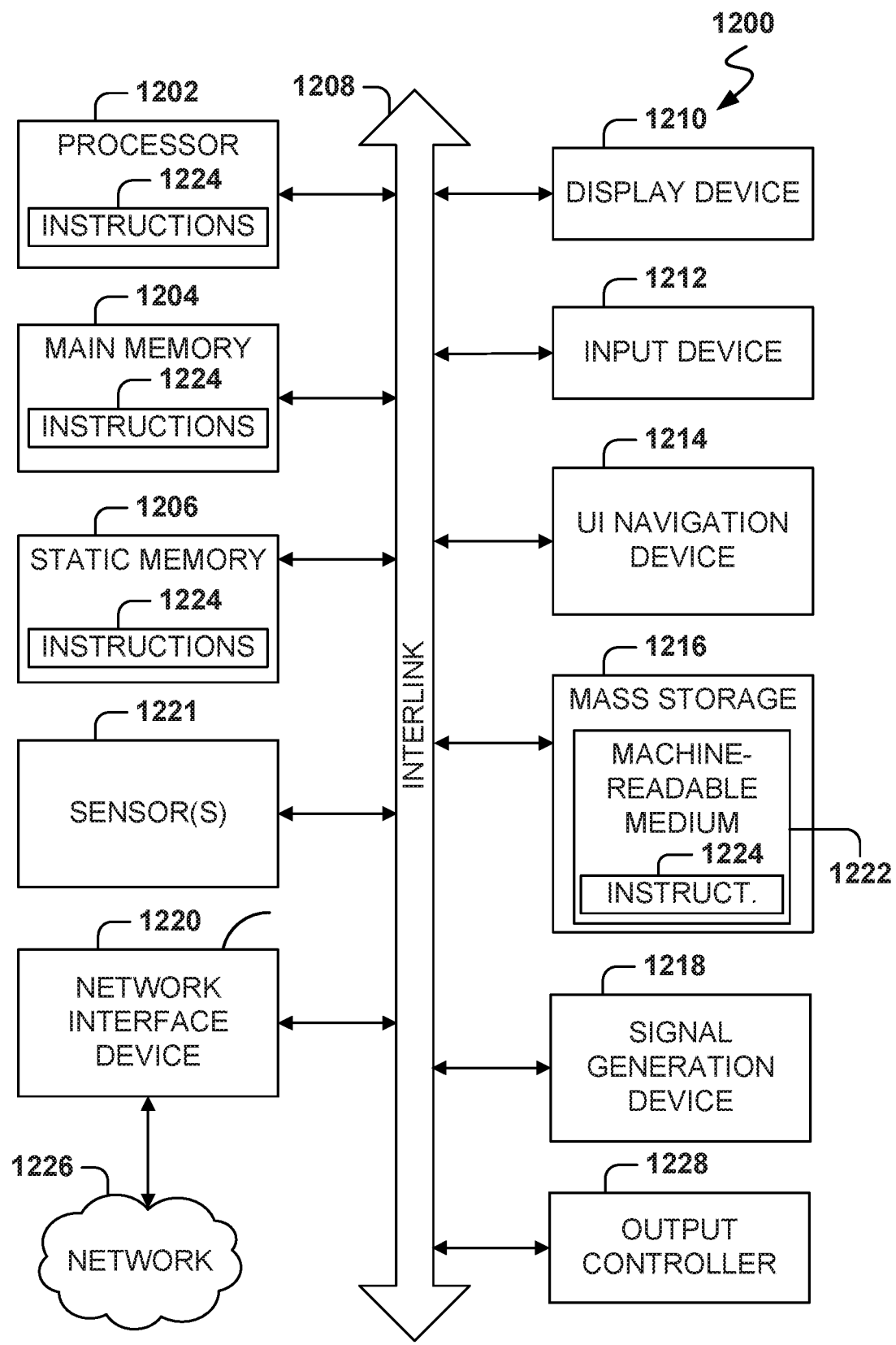
FIG. 12 is a block diagram illustrating an example of a machine upon which one or more example embodiments may be implemented.

FIG. 12 is a block diagram illustrating an example of a machine 1200 upon which one or more example embodiments may be implemented. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display device 1210, an alphanumeric input device 1212 (e.g., a keyboard), and a user interface (UI) navigation device 1214 (e.g., a mouse). In an example, the display device 1210, input device 1212 and UI navigation device 1214 may be a touch screen display. The machine 1200 may additionally include a mass storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

The term "machine-readable medium" may include any medium that is capable of storing, encoding, or carrying instructions 1224 for execution by the machine 1200 and that cause the machine 1200 to perform any one or more of the techniques of the present disclosure, or that is capable of storing, encoding or carrying data structures used by or associated with such instructions 1224. Non-limiting machine-readable medium examples may include solid-state memories, and optical and magnetic media. In an example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1224 for execution by the machine 1200, and includes digital or analog communications signals or other intangible medium to facilitate communication of such software.

ADDITIONAL NOTES & EXAMPLES

Example 1 is a system comprising: a geographic service routing agent (GSRA) to: identify resources for delivering a network service, the resources being classified by geographic area from a plurality of geographic areas; select service agents to configure the identified resources, each service agent to manage service pools for delivering the network service across at least one geographic area, the service agents being selected to provide configurability for the service pools to deliver the network service for the identified resources; send respective configuration rules to each selected service agent, the configuration rules configured to establish the service pools for delivering the network service across the plurality of geographic areas; collect service traffic information from the service agents; adjust the resources for delivering the network service based on the collected service traffic information; and send updated respective configuration rules to the service agents based on the adjustment.

In Example 2, the subject matter of Example 1 optionally includes wherein to identify the resources the GSRA is further to: identify a number of clients of the network service by each of the geographic areas.

In Example 3, the subject matter of any one or more of Examples 1-2 optionally include wherein to identify the resources the GSRA is further to: determine a number of service handlers by geography.

In Example 4, the subject matter of any one or more of Examples 1-3 optionally include wherein to identify the resources the GSRA is further to: allocate service handlers to locations at an edge of a network for lower latency based on client demand for the network service.

In Example 5, the subject matter of Example 4 optionally includes wherein to select the service agents the GSRA is further to: determine an amount of clients accessing the network service by geographic area; and select a service handler based on the amount of clients accessing the service.

In Example 6, the subject matter of Example 5 optionally includes wherein at least one service agent configures the selected service handlers to deliver the network service.

In Example 7, the subject matter of any one or more of Examples 1-6 optionally include wherein each service pool includes at least one handler executing on a server device or in a processor configured within a network switching device.

In Example 8, the subject matter of any one or more of Examples 1-7 optionally include wherein to collect the service traffic information the GSRA is further to: utilize a diamond application programming interface to collect service traffic statistics.

In Example 9, the subject matter of any one or more of Examples 1-8 optionally include wherein to adjust the resources the GSRA is further to: reduce resources allocated at a geographic location when demand decreases at the geographic location.

In Example 10, the subject matter of any one or more of Examples 1-9 optionally include wherein to adjust the resources the GSRA is further to: determine that more resources are needed to support a quality of service metric; identify whether additional resources are available; and assign additional resources when the additional resources are available.

In Example 11, the subject matter of Example 10 optionally includes wherein additional resources are not available, wherein the GSRA is further to: identify another network service with a lower priority and allocated resources; and reallocate resources from the another network service to the network service.

In Example 12, the subject matter of any one or more of Examples 1-11 optionally include wherein a first configuration rule comprises a number of service handlers to be allocated at a first geographic area.

In Example 13, the subject matter of any one or more of Examples 1-12 optionally include wherein a second configuration rule includes a policy for collecting service metrics and for reporting the collected service metrics.

Example 14 is a method comprising: identifying resources for delivering a network service, the resources being classified by geographic area from a plurality of geographic areas; selecting service agents to configure the identified resources, each service agent to manage service pools for delivering the network service across at least one geographic area, the service agents being selected to provide configurability for the service pools to deliver the network service for the identified resources; sending respective configuration rules to each selected service agent, the configuration rules configured to establish the service pools for delivering the network service across the plurality of geographic areas; collecting service traffic information from the service agents; adjusting the resources for delivering the network service based on the collected service traffic information; and sending updated respective configuration rules to the service agents based on the adjusting.

In Example 15, the subject matter of Example 14 optionally includes wherein the identifying resources further comprises: identifying a number of clients of the network service by each of the geographic areas.

In Example 16, the subject matter of any one or more of Examples 14-15 optionally include wherein the identifying resources further comprises: determining a number of service handlers by geography.

In Example 17, the subject matter of any one or more of Examples 14-16 optionally include wherein the identifying resources further comprises: allocating service handlers to locations at an edge of a network for lower latency based on client demand for the network service.

In Example 18, the subject matter of Example 17 optionally includes wherein the selecting of service agents further comprises: determining an amount of clients accessing the network service by geographic area; and selecting a service handler based on the amount of clients accessing the service.

In Example 19, the subject matter of Example 18 optionally includes wherein at least one service agent configures the selected service handlers to deliver the network service.

In Example 20, the subject matter of any one or more of Examples 14-19 optionally include wherein each service pool includes at least one handler executing on a server device or in a processor configured within a network switching device.

In Example 21, the subject matter of any one or more of Examples 14-20 optionally include wherein the collecting service traffic information further comprises: utilizing a diamond application programming interface to collect service traffic statistics.

In Example 22, the subject matter of any one or more of Examples 14-21 optionally include wherein the adjusting the resources further comprises: reducing resources allocated at a geographic location when demand decreases at the geographic location.

In Example 23, the subject matter of any one or more of Examples 14-22 optionally include wherein the adjusting the resources further comprises: determining that more resources are needed to support a quality of service metric; identifying whether additional resources are available; and assigning additional resources when the additional resources are available.

In Example 24, the subject matter of Example 23 optionally includes wherein additional resources are not available, the method further comprising: identifying another network service with a lower priority and allocated resources; and reallocating resources from the another network service to the network service.

In Example 25, the subject matter of any one or more of Examples 14-24 optionally include wherein a first configuration rule comprises a number of service handlers to be allocated at a first geographic area.

In Example 26, the subject matter of any one or more of Examples 14-25 optionally include wherein a second configuration rule includes a policy for collecting service metrics and for reporting the collected service metrics.

Example 27 is a system comprising means to perform any method of Examples 14 to 26.

Example 28 is at least one machine-readable media including instructions that, when executed by a machine, cause the machine to perform any method of Examples 14-26.

Example 29 is at least one machine readable medium including instructions that, when executed by a machine, cause the machine to: identify resources for delivering a network service, the resources being classified by geographic area from a plurality of geographic areas; select service agents to configure the identified resources, each service agent to manage service pools for delivering the network service across at least one geographic area, the service agents being selected to provide configurability for the service pools to deliver the network service for the identified resources; send respective configuration rules to each selected service agent, the configuration rules configured to establish the service pools for deliver the network service across the plurality of geographic areas; collect service traffic information from the service agents; adjust the resources for delivering the network service based on the collected service traffic information; and send updated respective configuration rules to the service agents based on the adjusting.

In Example 30, the subject matter of Example 29 optionally includes wherein to identify resources the instructions further cause the machine to: identify a number of clients of the network service by each of the geographic areas.

In Example 31, the subject matter of any one or more of Examples 29-30 optionally include wherein to identify resources the instructions further cause the machine to: determine a number of service handlers by geography.

In Example 32, the subject matter of any one or more of Examples 29-31 optionally include wherein to identify resources the instructions further cause the machine to: allocate service handlers to locations at an edge of a network for lower latency based on client demand for the network service.

In Example 33, the subject matter of Example 32 optionally includes wherein to select service agents the instructions further cause the machine to: determine an amount of clients accessing the network service by geographic area; and select a service handler based on the amount of clients accessing the service.

In Example 34, the subject matter of Example 33 optionally includes wherein at least one service agent configures the selected service handlers to deliver the network service.

In Example 35, the subject matter of any one or more of Examples 29-34 optionally include wherein each service pool includes at least one handler executing on a server device or in a processor configured within a network switching device.

In Example 36, the subject matter of any one or more of Examples 29-35 optionally include wherein to collect the service traffic information the instructions further cause the machine to: utilize a diamond application programming interface to collect service traffic statistics.

In Example 37, the subject matter of any one or more of Examples 29-36 optionally include wherein to adjust the resources the instructions further cause the machine to: reduce resources allocated at a geographic location when demand decreases at the geographic location.

In Example 38, the subject matter of any one or more of Examples 29-37 optionally include wherein to adjust the resources the instructions further cause the machine to: determine that more resources are needed to support a quality of service metric; identify whether additional resources are available; and assign additional resources when the additional resources are available.

In Example 39, the subject matter of Example 38 optionally includes wherein additional resources are not available, the instructions further cause the machine to: identify another network service with a lower priority and allocated resources; and reallocate resources from the another network service to the network service.

In Example 40, the subject matter of any one or more of Examples 29-39 optionally include wherein a first configuration rule comprises a number of service handlers to be allocated at a first geographic area.

In Example 41, the subject matter of any one or more of Examples 29-40 optionally include wherein a second configuration rule includes a policy for collecting service metrics and for reporting the collected service metrics.

Example 42 is a system comprising: means for identifying resources for delivering a network service, the resources being classified by geographic area from a plurality of geographic areas; means for selecting service agents to configure the identified resources, each service agent to manage service pools for delivering the network service across at least one geographic area, the service agents being selected to provide configurability for the service pools to deliver the network service for the identified resources; means for sending respective configuration rules to each selected service agent, the configuration rules configured to establish the service pools for delivering the network service across the plurality of geographic areas; means for collecting service traffic information from the service agents; means for adjusting the resources for delivering the network service based on the collected service traffic information; and means for sending updated respective configuration rules to the service agents based on the adjusting.

In Example 43, the subject matter of Example 42 optionally includes wherein the identifying resources further comprises: means for identifying a number of clients of the network service by each of the geographic areas.

In Example 44, the subject matter of any one or more of Examples 42-43 optionally include wherein the identifying resources further comprises: means for determining a number of service handlers by geography.

In Example 45, the subject matter of any one or more of Examples 42-44 optionally include wherein the identifying resources further comprises: means for allocating service handlers to locations at an edge of a network for lower latency based on client demand for the network service.

In Example 46, the subject matter of Example 45 optionally includes wherein the selecting of service agents further comprises: means for determining an amount of clients accessing the network service by geographic area; and means for selecting a service handler based on the amount of clients accessing the service.

In Example 47, the subject matter of Example 46 optionally includes wherein at least one service agent configures the selected service handlers to deliver the network service.

In Example 48, the subject matter of any one or more of Examples 42-47 optionally include wherein each service pool includes at least one handler executing on a server device or in a processor configured within a network switching device.

In Example 49, the subject matter of any one or more of Examples 42-48 optionally include wherein the collecting service traffic information further comprises: means for utilizing a diamond application programming interface to collect service traffic statistics.

In Example 50, the subject matter of any one or more of Examples 42-49 optionally include wherein the adjusting the resources further comprises: means for reducing resources allocated at a geographic location when demand decreases at the geographic location.

In Example 51, the subject matter of any one or more of Examples 42-50 optionally include wherein the adjusting the resources further comprises: means for determining that more resources are needed to support a quality of service metric; means for identifying whether additional resources are available; and means for assigning additional resources when the additional resources are available.

In Example 52, the subject matter of Example 51 optionally includes wherein additional resources are not available, the system further comprising: means for identifying another network service with a lower priority and allocated resources; and means for reallocating resources from the another network service to the network service.

In Example 53, the subject matter of any one or more of Examples 42-52 optionally include wherein a first configuration rule comprises a number of service handlers to be allocated at a first geographic area.

In Example 54, the subject matter of any one or more of Examples 42-53 optionally include wherein a second configuration rule includes a policy for collecting service metrics and for reporting the collected service metrics.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present embodiments also contemplate examples in which only those elements shown or described are provided. Moreover, the present embodiments also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system comprising:
   at least one processor; and
   memory including instructions to provide a service routing agent that, when executed by the at least one processor, cause the at least one processor to:
   identify resources for delivering a network service to clients requesting services, the resources being classified by service area from a plurality of service areas;
   determine service agents to configure the identified resources, each service agent to manage service handler pools for delivering the network service across at least one service area, the service agents being selected to provide a configuration for the service handler pools to deliver the network service for the identified resources, wherein to determine the service agents includes instructions to:
   determine a number of clients accessing the network service associated with each service area; and
   select a service handler instance for a respective service area based on the number of clients accessing the network service associated with the respective service area;
   send respective configuration rules to each determined service agent, the configuration rules configured to establish the service handler pools for delivering the network service across the plurality of service areas;
   collect service traffic information from the service agents;
   adjust the resources at the service handler pools for delivering the network service based on the collected service traffic information; and send updated respective configuration rules for the service handler pools to each determined service agent based on the adjustment.

2. The system as recited in claim 1, wherein to identify the resources, further includes identifying a number of clients of the network service by each of the service areas.

3. The system as recited in claim 1, wherein to identify the resources, further includes determining a number of service handlers by geography.

4. The system as recited in claim 1, including instructions to:
allocate service handlers to locations at an edge of a network for lower latency based on client demand for the network service.

5. The system as recited in claim 1, wherein at least one service agent configures the selected service handlers to deliver the network service.

6. The system as recited in claim 1, wherein each service handler pool includes at least one service handler executing on a server device or in a processor configured within a network switching device.

7. The system as recited in claim 1, wherein the service traffic information is collected using a diamond application programming interface to collect service traffic statistics.

8. The system as recited in claim 1, wherein to adjust the resources further includes reducing resources allocated at a geographic location when demand decreases at the geographic location.

9. The system as recited in claim 1, wherein to adjust the resources includes instructions to:
determine that more resources are needed to support a quality of service metric;
identify additional resources; and
assign the additional resources.

10. The system as recited in claim 1, wherein the plurality of service areas are defined by one of geographic area, network coverage area, service provider area, or nationality borders.

11. A method comprising:
identifying resources for delivering a network service to clients requesting services, the resources being classified by service area from a plurality of service areas;
determining service agents to configure the identified; resources, each service agent to manage service handler pools for delivering the network service across at least one service area, the service agents being selected to provide a configuration for the service handler pools to deliver the network service for the identified resources, wherein to determine the service agents includes:
determining a number of clients accessing the network service associated with each service area; and
selecting a service handler instance for a respective service area based on the number of clients accessing the network service associated with the respective service area;
sending respective configuration rules to each determined service agent, the configuration rules configured to establish the service handler pools for delivering the network service across the plurality of service areas;
collecting service traffic information from the service agents;
adjusting the resources at the service handler pools for delivering the network service based on the collected service traffic information; and
sending updated respective configuration rules for the service handler pools to each determined service agent based on the adjusting.

12. The method as recited in claim 11, wherein identifying resources further comprises:
identifying a number of clients of the network service by each of the service areas.

13. The method as recited in claim 11, wherein identifying resources further comprises:
determining a number of service handlers by geography.

14. The method as recited in claim 11, wherein identifying resources further comprises:
allocating service handlers to locations at an edge of a network for lower latency based on client demand for the network service.

15. The method as recited in claim 11, wherein each service handler pool includes at least one service handler executing on a server device or in a processor configured within a network switching device.

16. The method as recited in claim 11, wherein collecting the service traffic information further comprises:
utilizing a diamond application programming interface to collect service traffic statistics.

17. The method as recited in claim 11, wherein the adjusting the resources further comprises:
determining that more resources are needed to support a quality of service metric;
identifying additional resources; and
assigning the additional resources.

18. The method as recited in claim 17, wherein identifying the additional resources further comprises:
determining that no free resources are available;
identifying another network service with a lower priority and allocated resources; and
reallocating resources from the another network service to the network service.

19. The method as recited in claim 11, wherein a first configuration rule comprises a number of service handlers to be allocated at a first service area.

20. The method as recited in claim 11, wherein the plurality of service areas are defined by one of geographic area, network coverage area, service provider area, or nationality borders.

21. At least one non-transitory machine readable medium including instructions that, when executed by a machine, cause the machine to:
identify resources for delivering a network service to clients requesting services, the resources being classified by service area from a plurality of service areas;
determine service agents to configure service pools of service handlers for delivering the identified; resources, each service agent to manage service handler pools for delivering the network service across at least one service area, the service agents being selected to provide a configuration for the service handler pools to deliver the network service for the identified resources, wherein to determine the service agents includes instructions that cause the machine to:
determine a number of clients accessing the network service associated with each service area; and
select a service handler instance for a respective service area based on the number of clients accessing the network service associated with the respective service area;

send respective configuration rules to each determined service agent, the configuration rules configured to establish the service handler pools for deliver the network service across the plurality of service areas;

collect service traffic information from the service agents;

adjust the resources at the service handler pools for delivering the network service based on the collected service traffic information; and send updated respective configuration rules for the service handler pools to each determined service agent based on the adjusting.

22. The at least one machine readable medium of claim 21, wherein to identify resources, the instructions further cause the machine to:

identify a number of clients of the network service by each of the service areas.

23. The at least one machine readable medium of claim 21, wherein to identify resources, the instructions further cause the machine to:

determine a number of service handlers by geography.

24. The at least one machine readable medium of claim 21, wherein to identify resources, the instructions further cause the machine to:

allocate service handlers to locations at an edge of a network for lower latency based on client demand for the network service.

25. The at least one machine readable medium of claim 21, wherein the plurality of service areas are defined by one of geographic area, network coverage area, service provider area, or nationality borders.

* * * * *

UNITED STATES PATENT AND TRADEMARK OFFICE
CERTIFICATE OF CORRECTION

PATENT NO. : 11,115,283 B2
APPLICATION NO. : 16/328140
DATED : September 7, 2021
INVENTOR(S) : Power et al.

Page 1 of 1

It is certified that error appears in the above-identified patent and that said Letters Patent is hereby corrected as shown below:

In the Claims

Column 24, Line 45, Claim 1, delete "identified;" and insert --identified-- therefor Column 25, Line 45, Claim 11, delete "identified;" and insert --identified-- therefor Column 26, Lines 52-53, Claim 21, after "configure", delete "service pools of service handlers for delivering"

Column 26, Line 53, Claim 21, delete "identified;" and insert --identified-- therefor Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*